(12) United States Patent
Hattori et al.

(10) Patent No.: US 8,700,995 B2
(45) Date of Patent: Apr. 15, 2014

(54) CONTENT CONVERSION SYSTEM AND RECORDING MEDIUM STORING COMPUTER PROGRAM

(75) Inventors: Gen Hattori, Fujimino (JP); Fumiaki Sugaya, Fujimino (JP)

(73) Assignee: KDDI Corporation, Tokyo (JP)

( * ) Notice: Subject to any disclaimer, the term of this patent is extended or adjusted under 35 U.S.C. 154(b) by 1199 days.

(21) Appl. No.: 12/598,503

(22) PCT Filed: May 2, 2008

(86) PCT No.: PCT/JP2008/058435
§ 371 (c)(1),
(2), (4) Date: Nov. 2, 2009

(87) PCT Pub. No.: WO2008/136514
PCT Pub. Date: Nov. 13, 2008

(65) Prior Publication Data
US 2010/0138738 A1 Jun. 3, 2010

(30) Foreign Application Priority Data
May 7, 2007 (JP) ................................. 2007-122527

(51) Int. Cl.
*G06F 17/00* (2006.01)
(52) U.S. Cl.
USPC .......................................... 715/246; 715/243
(58) Field of Classification Search
USPC ................... 715/243, 200, 246, 234
See application file for complete search history.

(56) References Cited

U.S. PATENT DOCUMENTS

| 7,225,397 | B2* | 5/2007 | Fukuda et al. | 715/230 |
| 7,246,306 | B2* | 7/2007 | Chen et al. | 715/205 |
| 2004/0049737 | A1* | 3/2004 | Simon Hunt et al. | 715/513 |
| 2006/0149775 | A1* | 7/2006 | Egnor | 707/102 |

FOREIGN PATENT DOCUMENTS

| JP | 2001-229106 | 8/2001 |
| JP | 2006-155147 | 6/2006 |
| KR | 10-2005-0040030 | 5/2005 |

OTHER PUBLICATIONS

Gen Hattori, et al., Fumiaki Sugaya, "Dynamic Segmentation of a Web page Based on Content-Distance Distribution", Information Processing Society Paper (transaction) database (TOD), vol. 47 No. SIG8, Jun. 2006.

Yuki Arase et al., "Keitai Denwa o Mochiita Web Etsuran no Tameno Contents Tekioteki Teiji System" Transactions of Information Processing Society of Japan, Dec. 15, 2006, vol. 47, No. 12, pp. 3149 to 3164.

* cited by examiner

*Primary Examiner* — Manglesh M Patel
(74) *Attorney, Agent, or Firm* — Morgan, Lewis & Bockius LLP

(57) ABSTRACT

A content conversion system according to the present invention divides content data in which a display layout of content components is described using tags, so as to display, on a terminal, contents formed of the content components displayed on a screen, and includes: a primary division unit that divides the content data on a basis of the display layout of the content components; and a secondary division unit that divides the content data on a basis of a distance between the content components in a data description, the secondary division unit divides primary divided content data divided by the primary division unit, and the primary division unit performs re-division of the primary divided content data according to number of divisions made by the secondary division unit.

3 Claims, 10 Drawing Sheets

CONTENT CONVERSION SYSTEM AND RECORDING MEDIUM STORING COMPUTER PROGRAM

TECHNICAL FIELD

The present invention relates to a content conversion system and a recording medium storing a computer program.

Priority is claimed on Japanese Patent Application No. 2007-122527 filed May 7, 2007, the content of which is incorporated herein by reference.

BACKGROUND ART

Recently, connecting from a mobile phone network to the internet has become possible. Users can access web sites on the internet using mobile terminals such as mobile phones. Generally, the memory capacity or the display screen size of a mobile terminal is small, and thus it is difficult to display a standard web page meant for a personal computer in its original size.

For this reason, related arts for providing divided web pages stepwise are disclosed in Patent documents 1 and 2, Non-patent document 1, and the like.

In Related Art 1 described in Patent Document 1, discontinuity of a tag structure is detected from an HTML document described by HTML (HyperText Markup Language), and the HTML document is divided before and after the discontinuity of the tag as a boundary on the basis of the upper limit capacity of a mobile terminal. When there is a line feed tag or a heading tag, it is divided before and after the line feed tag or the heading tag as the boundary. The number of divisions is determined for a table in the web page on the basis of the upper limit capacity of the mobile terminal. In Related Art 1, it is possible to divide a simple web page configuration formed of texts and tables without any problem. However, in Related Art 1, there is a problem that it is difficult to appropriately divide various web page configurations. On the other hand, in Related Art 2 described in Patent Document 2, a division point in a web page is determined on the basis of a distance between content components in the data description in an HTML document for displaying the web page formed of content components displayed on the screen. In Related Art 3 described in Non-patent document 1, a determination standard for determining a division point in a web page is created on the basis of a dispersion value of the distance values between content components in the data description in the HTML document.

[Patent document 1] Japanese Unexamined Patent Application, First Publication No. 2001-229106
[Patent document 2] Japanese Unexamined Patent Application, First Publication No. 2006-155147
[Non-patent document 1] Gen HATTORI, Kazunori MATSUMOTO, Fumiaki SUGAYA, "Dynamic Segmentation of a Web Page Based on Content-Distance Distribution", Information Processing Society Paper (transaction) database (TOD), Vol. 47 No. SIG8, June, 2006

DISCLOSURE OF INVENTION

Problem to be Solved by the Invention

However, in Related Art 1, when there is no line feed tag or heading tag or table-format information using a table and a layout of content components using a table are mixed together, there is a problem in that it is difficult to appropriately divide various web page configurations. Meanwhile, in Related Arts 2 and 3, even when there is no line feed tag or heading tag, or table-format information using a table and a layout of content components using a table are mixed together, it is possible to perform division appropriately. However, when the distance between content components in the data description in the HTML document does not coincide with a distance between content components at the time of actual screen display, the appropriate division according to the display layout of the original web page before the division may not be performed.

For example, content components (c) and (d) are separated from each other on a web page displayed on the screen exemplified in FIG. 11, and thus it is preferable to determine a division point of the web page to display the content components (c) and (d) on different screens after web page division.

However, in the HTML document corresponding to the web page shown in FIG. 12, the content components (c) and (d) are not separated so much in the data description. For this reason, when the division point of the web page is determined on the basis of the distance between the content components in the data description, the division point may be determined to display the content components (c) and (d) on the same screen even after the division. As a result, a display result which does not correspond to the display layout of the original web page before the division may be produced.

The present invention has been made in consideration of such circumstances. An object of the present invention is to provide a content conversion system contributing to appropriate division according to a display layout of the original contents before division at the time of dividing the contents and providing the contents to a mobile terminal or the like, in a case where the contents such as web pages are formed of content components such as images, texts, and hyperlinks, and the display layout of the content components is designated using a tag description such as in HTML.

Another object of the present invention is to provide a recording medium storing a computer program to realize the content conversion system of the present invention using a computer.

Means for Solving the Problem

To solve the problems, a content conversion system according to the present invention divides content data in which a display layout of content components is described using tags, so as to display, on a terminal, contents formed of the content components displayed on a screen, and includes: a primary division unit that divides the content data on a basis of the display layout of the content components; and a secondary division unit that divides the content data on a basis of a distance between the content components in a data description, the secondary division unit divides primary divided content data divided by the primary division unit, and the primary division unit performs re-division of the primary divided content data according to number of divisions made by the secondary division unit.

In the content conversion system according to the present invention, the primary division unit may calculate a density obtained by dividing a display area related to the primary divided content data by the number of divisions made by the secondary division unit, and may repeat the re-division until the density satisfies a predetermined condition.

In the content conversion system according to the present invention, the primary division unit may calculate the display area related to the primary divided content data using a tag attribute value representing size of the content components.

The content conversion system according to the present invention may further include: a layout related tag determining unit that determines whether or not the content data includes a layout related tag, and only dividing by the secondary division unit may be performed when the content data includes no layout related tag.

In the content conversion system according to the present invention, the layout related tag determining unit may determine whether or not a description of the layout related tag in the content data is grammatically correct, and only dividing by the secondary division unit may be performed when the description of the layout related tag is grammatically incorrect.

A recording medium according to the present invention stores a computer program for performing content conversion of dividing content data in which a display layout of content components is described using tags, so as to display, on a terminal, contents formed of the content components displayed on a screen, and the computer program includes: a primary division function that divides the content data on a basis of the display layout of the content components; and a secondary division function that divides the content data on a basis of a distance between the content components in a data description, the secondary division function divides primary divided content data divided by the primary division function, and the primary division function performs re-division of the primary divided content data according to number of divisions made by the secondary division function.

Accordingly, it is possible to realize the content conversion system using the recording medium storing the computer.

Effect of the Invention

According to the present invention, it is possible to obtain an advantage of contributing to appropriate division according to the display layout of the original contents before division at the time of dividing the contents and provide the contents to a mobile terminal or the like, in a case where the contents such as web pages are formed of content components such as images, texts, and hyperlinks, and the display layout of the content components is designated using a tag description such as HTML.

REFERENCE SYMBOLS

1 Content conversion server (content conversion system)
11 Content data acquiring unit
12 Layout related tag determining unit
13 Primary division unit
14 Secondary division unit
15 Reconfiguration unit

BEST MODE FOR CARRYING OUT THE INVENTION

Hereinafter, embodiments of the present invention will be described with reference to the drawings.

Contents according to the present invention are formed of content components such as images, texts, and hyperlinks, and a display layout of the content components is designated using a tag description such as HTML. In the present embodiment, a web page will be described as an example of the contents according to the present invention. An HTML document will be described as an example of data designating the display layout of the content components displayed on the web page.

Figure 1:
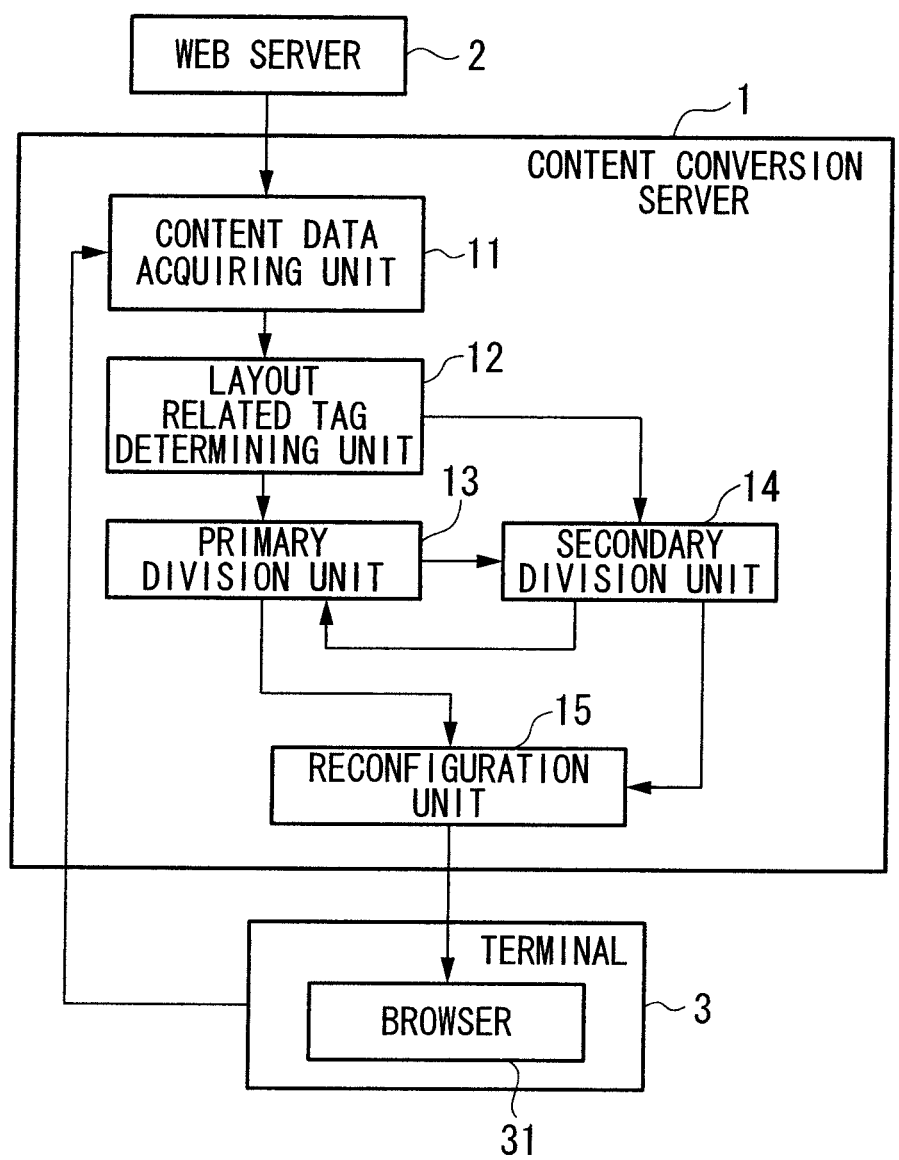
FIG. 1 is a block diagram illustrating a configuration of a content conversion server according to an embodiment of the present invention.

FIG. 1 is a block diagram illustrating a configuration of a content conversion server 1 according to an embodiment of the present invention. In FIG. 1, the content conversion server 1 includes a content data acquiring unit 11, a layout related tag determining unit 12, a primary division unit 13, a secondary division unit 14, and a reconfiguration unit 15.

The content conversion server 1 is connected to a communication network such as the internet.

The content conversion server 1 can access to a web server 2 provided on the communication network, and acquire, from the web server 2, content data for displaying a web page provided by the web server 2.

The content data includes the content components displayed on the web page, and the HTML document designating the display layout of the content components. As the content components, for example, there are images, texts, hyperlinks, and the like. The content components may be incorporated in the HTML document or may be provided as a file separate from the HTML document. For example, texts and hyperlinks are generally incorporated in the HTML document. On the other hand, images are generally provided as a file separate from the HTML document, and the HTML document includes information (e.g., a URL (Uniform Resource Locator)) representing the location of the image file.

The content conversion server 1 can transmit and receive data to and from a terminal 3 through the communication network. The terminal 3 may be a mobile terminal for wireless communication or a fixed terminal for wired communication. For example, a mobile phone terminal that is a registered terminal of a mobile phone network may be used as the terminal 3. The terminal 3 has a browser 31 for achieving browsing various web pages. The browser 31 acquires content data of the web page that is a browsing target by the terminal 3 through the communication network according to a web page browsing operation of a user of the terminal 3, and displays the web page on a display device of the terminal 3 on the basis of the acquired content data.

In the content conversion server 1 shown in FIG. 1, the content data acquiring unit 11 receives a web page acquisition request from the browser 31 operated by the terminal 3, and acquires the content data from the web server 2 in response to the request.

The layout related tag determining unit 12 analyzes a structure of the tag described in the HTML document in the content data, and creates a tree representing the hierarchical structure of the layout related tags. The tree is transmitted to the primary division unit 13. The layout related tag is a tag usable for the display layout of the content components. As the layout related tags in HTML, for example, there are table related tags such as <table>, <tr>, and <td>, and a layout block definition related tag such as <div>.

The primary division unit 13 divides the HTML document on the basis of the density of a web page display area. The primary division unit 13 divides the HTML document into the former part and the latter part with transition of the structure of the layout related tag as a boundary. The primary division unit 13 determines a division point of the HTML document to suppress the density of the web page display area corresponding to the HTML document after division to be lower than a predetermined value. On this occasion, a division result of the secondary division unit 14 is considered. The primary division unit 13 performs general division of the HTML document based on the display layout of the content components.

The secondary division unit 14 divides the HTML document on the basis of a distance between the content components in the data description in the HTML document.

The reconfiguration unit 15 reconfigures complete HTML documents by performing such as addition of headers to the HTML documents divided by the primary division unit 13 and the secondary division unit 14. Each of the reconfigured HTML documents corresponds to one web page. The reconfiguration unit 15 returns the reconfigured HTML document with the content components to the terminal 3 in order in response to the request from the browser 31. Accordingly, the terminal 3 receives the HTML document and the content components transmitted from the content conversion server 1, and can display the divided web pages.

Next, an operation of the content conversion server 1 shown in FIG. 1 will be described in detail.

First, a flow of the whole web page division process in the content conversion server 1 shown in FIG. 1 will be described with reference to FIG. 2.

Figure 2:
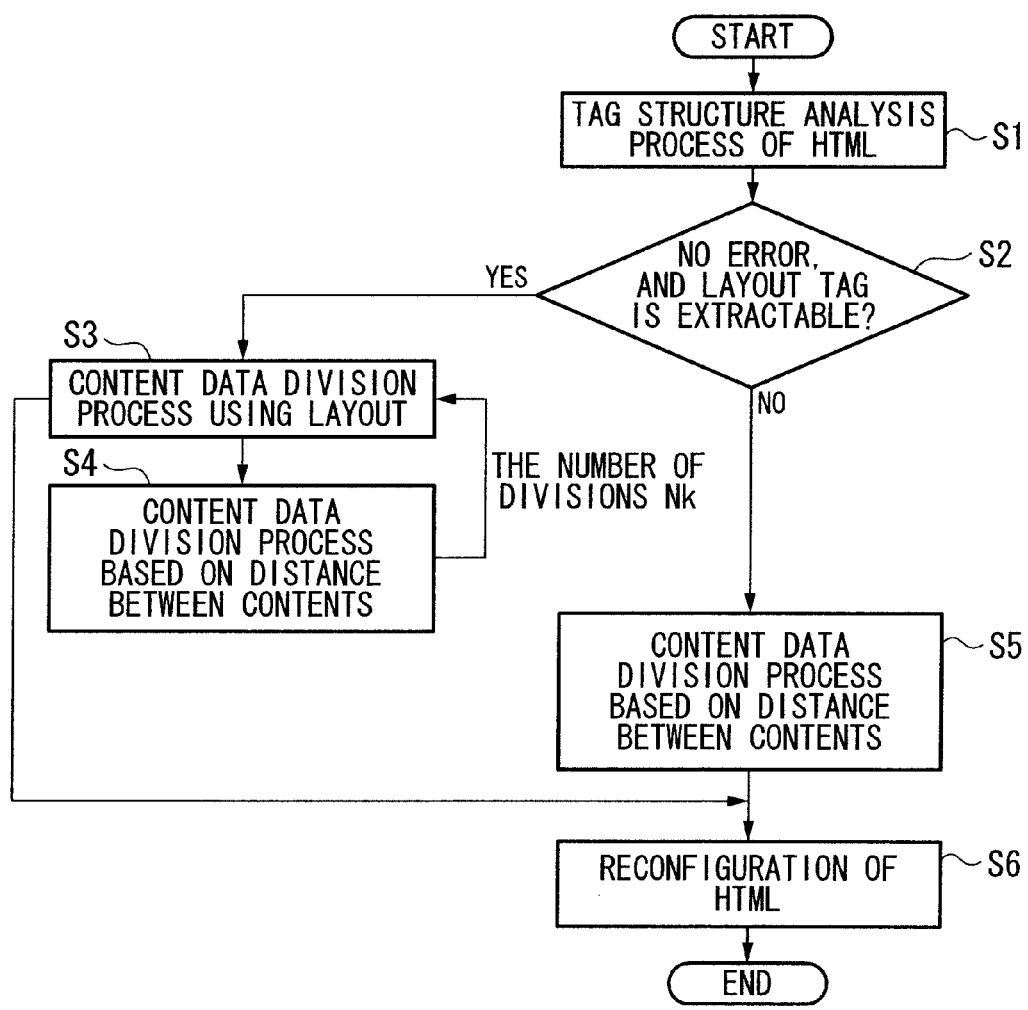
FIG. 2 is a flowchart illustrating a flow of processes in the content conversion server in FIG. 1.

FIG. 2 is a flowchart illustrating a flow of a process in the content conversion server 1 shown in FIG. 1. In FIG. 2, in Step S1, the content data acquiring unit 11 acquires content data from the web server 2. Furthermore, the layout related tag determining unit 12 analyzes the structure of the tags described in the HTML document in the content data. At this time, the layout related tag determining unit 12 detects the layout related tags in the HTML document from a shallow hierarchy to a deep hierarchy in order, and creates a tree representing the hierarchical structure of the layout related tags. The tree is used in the primary division unit 13.

Subsequently, in Step S2, the layout related tag determining unit 12 determines whether or not there exists a layout related tag and there is no grammatical error in the layout related tag in the HTML document. When the determination result is YES, the process proceeds to Steps S3 and S4. When the determination result is NO, the process proceeds to Step S5.

In Steps S3 and S4, in the HTML document that is a division target, a layout related tag exists and there is no grammatical error in the layout related tag, and thus division (primary division) of the HTML document based on layout related tags and the density of the web page display area and division (secondary division) of the HTML document based on the distance between content components in the data description are performed in combination.

First, in Step S3, the primary division unit 13 performs the division (primary division) of the HTML document on the basis of the density of the web page display area. In the division performed by the primary division unit 13, the HTML document is divided into the former part and the latter part with the structure of the layout related tag being changed as a boundary. Subsequently, in Step S4, HTML documents (primary divided HTML documents) after the primary division performed by the primary division unit 13 are set to be a division target, and the secondary division unit 14 further performs the division (secondary division) of the primary divided HTML documents based on the distance between contents component in the data description. The secondary division unit 14 transmits the number of divisions Nk for each primary divided HTML document to the primary division unit 13.

When the primary division unit 13 receives the number of divisions Nk for each primary divided HTML document from the secondary division unit 14, it performs the process of Step S3 again. In the process of Step S3, the primary division unit 13 calculates a density of the web page display area for each primary divided HTML document on the basis of the number of divisions Nk. When the density is equal to or higher than a predetermined value, the primary division unit 13 further divides the primary divided HTML document. The divided HTML documents are considered to be new primary divided HTML documents, and the process proceeds to Step S4.

The processes of Steps S3 and S4 are repeated until all the primary divided HTML documents satisfy the density condition of the web page display area, that is, until the densities of the web page display areas corresponding to all the primary divided HTML documents are lower than a predetermined value. When the densities of the web page display areas corresponding to all the primary divided HTML documents are lower than the predetermined value, the primary division unit 13 receives all the results of the primary division at that time from the secondary division unit 14 and transmits the HTML documents obtained by secondarily dividing the primary divided HTML documents to the reconfiguration unit 15.

Meanwhile, in Step S5, since in the HTML document that is the division target, there is no layout related tag or there is a grammatical error in the layout related tag, the division of the HTML document based on the layout related tag as a boundary is not performed, and only the division of the HTML document based on the distance between the content components in the data description is performed. Accordingly, in Step S5, the secondary division unit 14 divides the HTML document on the basis of the distance between the content components in the data description of the HTML document that is the division target. The secondary division unit 14 transmits the divided HTML documents to the reconfiguration unit 15.

Then, in Step S6, the reconfiguration unit 15 performs such as addition of headers to each of the HTML documents divided in Steps S3 and S4 or to each of the HTML documents divided in Step S5, and reconfigures them into complete HTML documents. The reconfigured HTML documents are transmitted with the content components to the terminal 3.

Next, an operation of the layout related tag determining unit 12 will be described with reference to FIG. 3.

Figure 3:
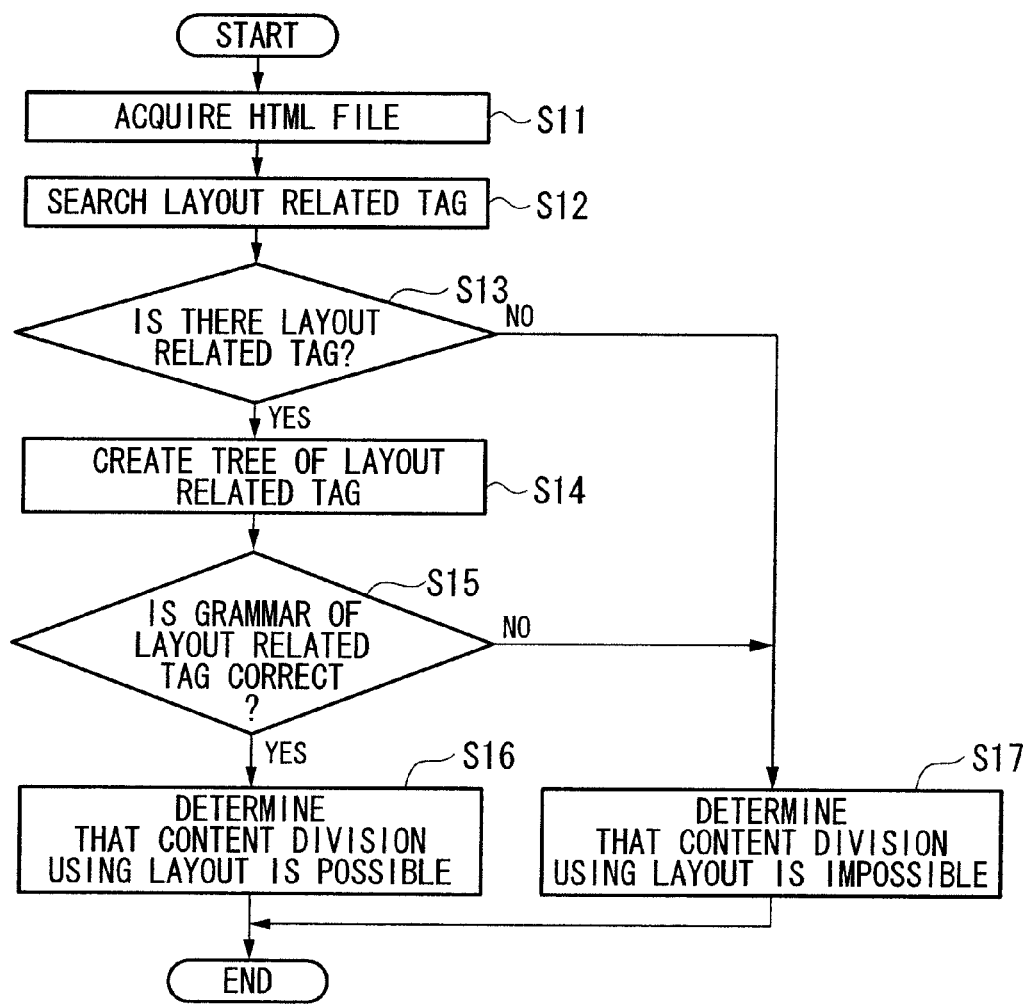
FIG. 3 is a flowchart illustrating a flow of a process in a layout related tag determining unit in FIG. 1.

FIG. 3 is a flowchart illustrating a flow of the process in the layout related tag determining unit 12 shown in FIG. 1. In FIG. 3, in Step S11, the HTML document (HTML file) in the content data acquired from the web server 2 by the content data acquiring unit 11 is acquired. Subsequently, in Step S12, the layout related tags in the HTML document are searched from a shallow hierarchy to a deep hierarchy in order.

In Step S13, it is determined whether or not a layout related tag exists in the HTML document. As a result, when there is a layout related tag, the process proceeds to Step S14. Meanwhile, when there is no layout related tag, the process proceeds to Step S17.

In Step S14, a tree in which the layout related tags detected from the shallow hierarchy to the deep hierarchy in order are positioned at the detected hierarchies is created. The tree representing the hierarchical structure of the layout related tags is used in the primary division unit 13. Subsequently, in Step S15, it is determined whether or not the description of the layout related tag is grammatically correct. In a method of determining whether the grammar is correct, when the description conforms to all the following regulations, it is determined that the description is correct.

(Regulation 1) Regarding any layout related tag, there should be a start tag and an end tag as a pair in the same hierarchy. For example, it is necessary that there is a start tag "<table>" and an end tag "</table>" of table tags as a pair. However, Regulation 1 does not apply to a case where an end tag can be omitted (e.g., <td>, etc.).

(Regulation 2) A tag name is what it is defined to be. Accordingly, a spelling mistake is considered as an error. However, the uppercase and lowercase of the alphabet are not distinguished.

(Regulation 3) Tags have a nested structure. Accordingly, a case where tags intersect is considered an error.

When the description of the layout related tag is grammatically correct, the process proceeds to Step S16. On the other hand, when the description of the layout related tag is not grammatically correct, the process proceeds to Step S17.

In Step S16, since a layout related tag exists, and there is no grammatical error in the layout related tag, it is determined that the HTML documents can be divided using the layout related tag as a boundary. Thus, the division of the HTML document based on the density of the web page display area sectioned by the layout related tag and the division of the HTML document based on the distance between the content components in the data description are performed in combination.

In Step S17, since there is either no layout related tag, or a grammatical error in the layout related tag, it is determined that the division of the HTML document using the layout related tag as a boundary is impossible. Thus, the division of the HTML document using the layout related tag as a boundary is not performed, and only the division of the HTML document based on the distance between the content components in the data description is performed.

Next, an operation of the primary division unit 13 will be described with reference to FIG. 4 and FIG. 5.

Figure 4:
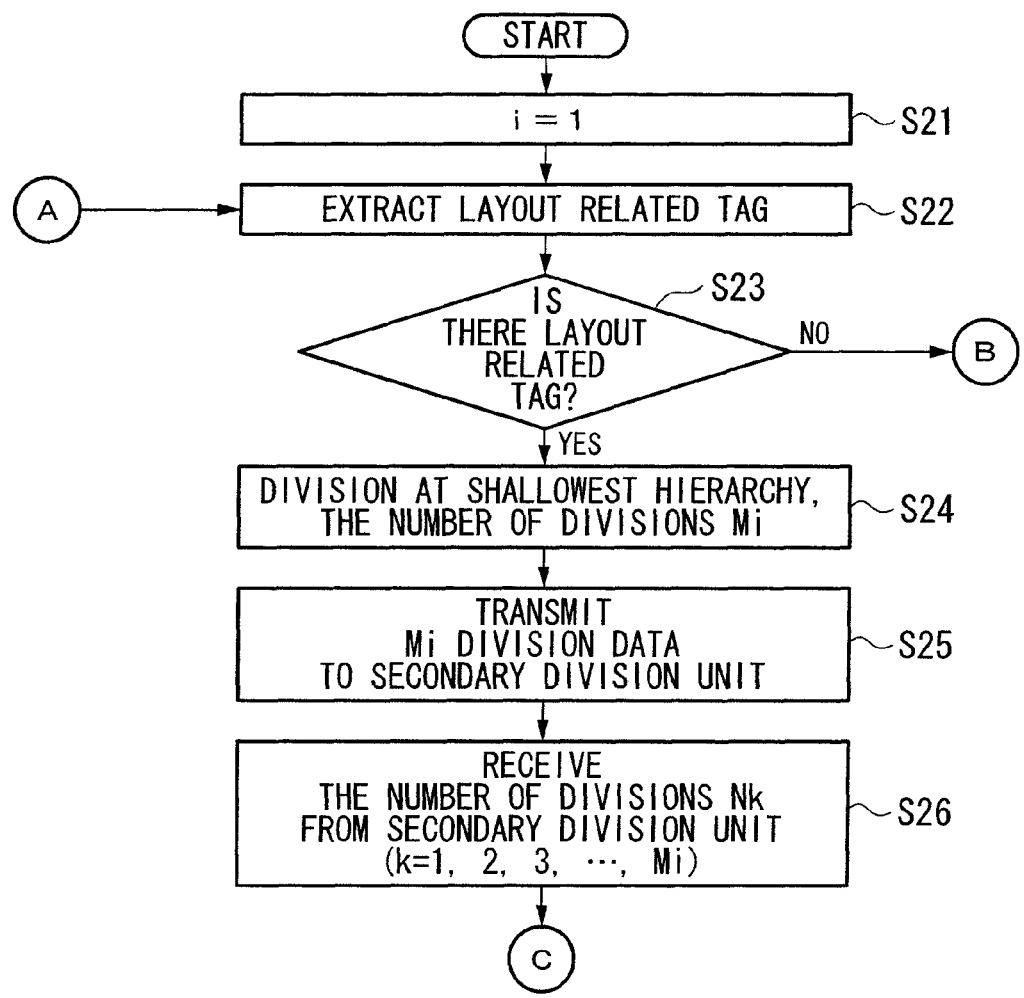
FIG. 4 is a flowchart illustrating a flow of a primary division process in a primary division unit in FIG. 1.
Figure 5:
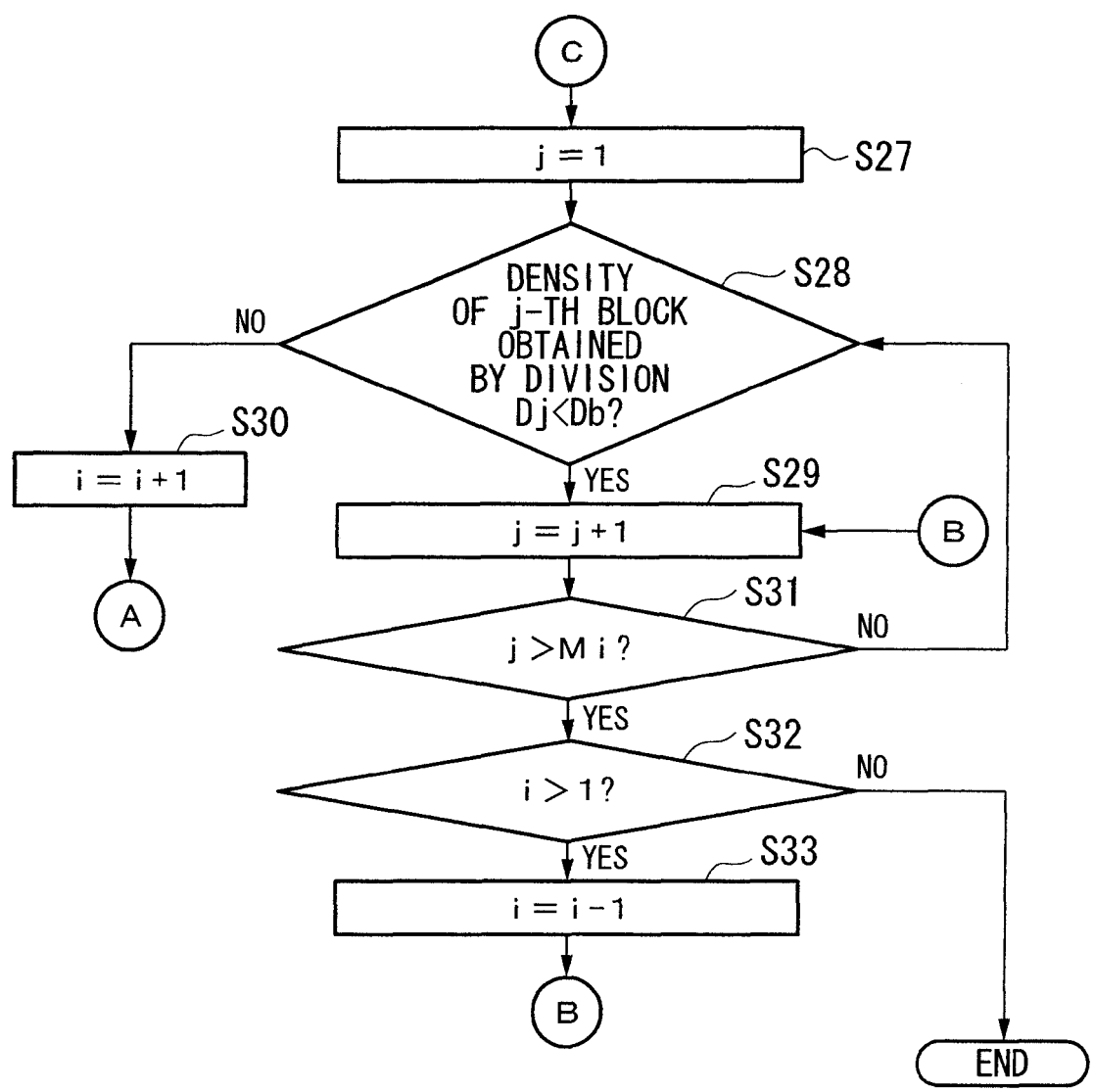
FIG. 5 is a flowchart illustrating a flow of the primary division process in the primary division unit in FIG. 1.

FIG. 4 and FIG. 5 are flowcharts illustrating flows of the primary division process in the primary division unit 13 shown in FIG. 1. In FIG. 4, in Step S21, a variable i is initialized to 1. The variable i represents a depth of a hierarchy on the tree representing the hierarchical structure of the layout related tag concerning the HTML document that is the division target. When the initial value of the variable i is "1", the value represents the shallowest first hierarchy. When the variable i is "2", the value represents the next shallowest second hierarchy. That is, the variable i represents the i-th hierarchy in order of shallowness.

Subsequently, in Step S22, in the HTML document that is the division target, the layout related tag in the i-th hierarchy is searched and extracted. In this case, when the layout related tag is detected, the process proceeds to Step S24. Meanwhile, when the layout related tag is not detected, the process proceeds to Step S29 shown in FIG. 5.

In Step S24, the HTML document is divided using the layout related tag detected in Step S22 as a boundary. At this time, the number of divisions is set to be Mi. Accordingly, Mi HTML documents after the primary division (primary divided HTML documents) are created.

Subsequently, in Step S25, the Mi primary divided HTML documents are transmitted to the secondary division unit 14. In Step S26, the number of divisions Nk (where k=1, 2, 3, . . . , Mi) for each of the Mi primary divided HTML documents is received from the secondary division unit 14.

Subsequently, in Step S27 shown in FIG. 5, a variable j is initialized to 1. The variable j represents a number of the primary divided HTML document in the i-th hierarchy. The initial value "1" of the variable j represents the first primary divided HTML document in the i-th hierarchy. When the variable j is "2", the value represents the second primary divided HTML document in the i-th hierarchy. That is, the variable j represents the j-th primary HTML document in the i-th hierarchy. The variable j is a value from 1 to Mi.

Subsequently, in Step S28, a density Dj concerning the j-th primary divided HTML document in the i-th hierarchy is calculated, and it is determined whether or not the density Dj is less than a predetermined value Db by comparing the density Dj with the predetermined value Db. The density Dj is calculated by the following equation based on the number of divisions Nk (where k=j) concerning the j-th primary divided HTML document in the i-th hierarchy and a display area Sj of the web page corresponding to the primary divided HTML document. A calculation method of the display area Sj will be described later.

$$\text{Density } Dj = \text{Display Area } Sj / \text{Number of Divisions } Nk$$

Here, the density Dj is an index representing whether or not the j-th primary divided HTML document in the i-th hierarchy can be appropriately divided by the secondary division of the secondary division unit 14. When the density Dj is high, that is, when the number of secondary divisions is small as compared to when the display area is large, it shows that the primary division is insufficient. When the primary division is insufficient, the primary division is further performed at the layout related tag of the deeper hierarchy by one stage as a boundary, to achieve the optimal division of combining the primary division with the secondary division.

When the density Dj concerning the j-th primary division HTML document in the i-th hierarchy is lower than the predetermined value Db, the process proceeds to Step S29. Meanwhile, when the density Dj is equal to or higher than the predetermined value Db, the process proceeds to Step S30.

In Step S29, since the density Dj concerning the j-th primary divided HTML document in the i-th hierarchy is lower than the predetermined value Db, 1 is added to the variable j to examine whether or not the density Dj concerning the next (j+1)-th primary divided HTML document in the i-th hierarchy is lower than the predetermined value Db. In Step S31, it is determined whether or not the examination of the density Dj for all (Mi) the primary divided HTML documents in the i-th hierarchy is completed by comparing the variable j with "Mi". When the examination of the density Dj for all the Mi primary divided HTML documents is completed, the process proceeds to Step S32. Meanwhile, when there are any primary divided HTML documents which have not been examined yet, the process returns to Step S28.

In Step S32, the variable i is compared with "1". In the case of a hierarchy deeper than the first hierarchy, the process proceeds to Step S33. Meanwhile, in the case of the first hierarchy, the process is ended.

In Step S33, 1 is subtracted from the variable i to make the hierarchy shallower by one stage, and the process returns to Step S29.

In Step S30, the density Dj concerning the j-th primary divided HTML document in the i-th hierarchy is equal to or higher than the predetermined value Db. Accordingly, 1 is added to the variable i to make the hierarchy deeper by one stage, and the process returns to Step S22 shown in FIG. 4.

The primary divisions of the HTML document are repeated by the processes shown in FIG. 4 and FIG. 5, until the density Dj concerning all the primary divided HTML documents is lower than the predetermined value Db.

Next, a method of calculating the display area Sj of the web page corresponding to the primary divided HTML document will be described with reference to FIG. 6.

Figure 6:
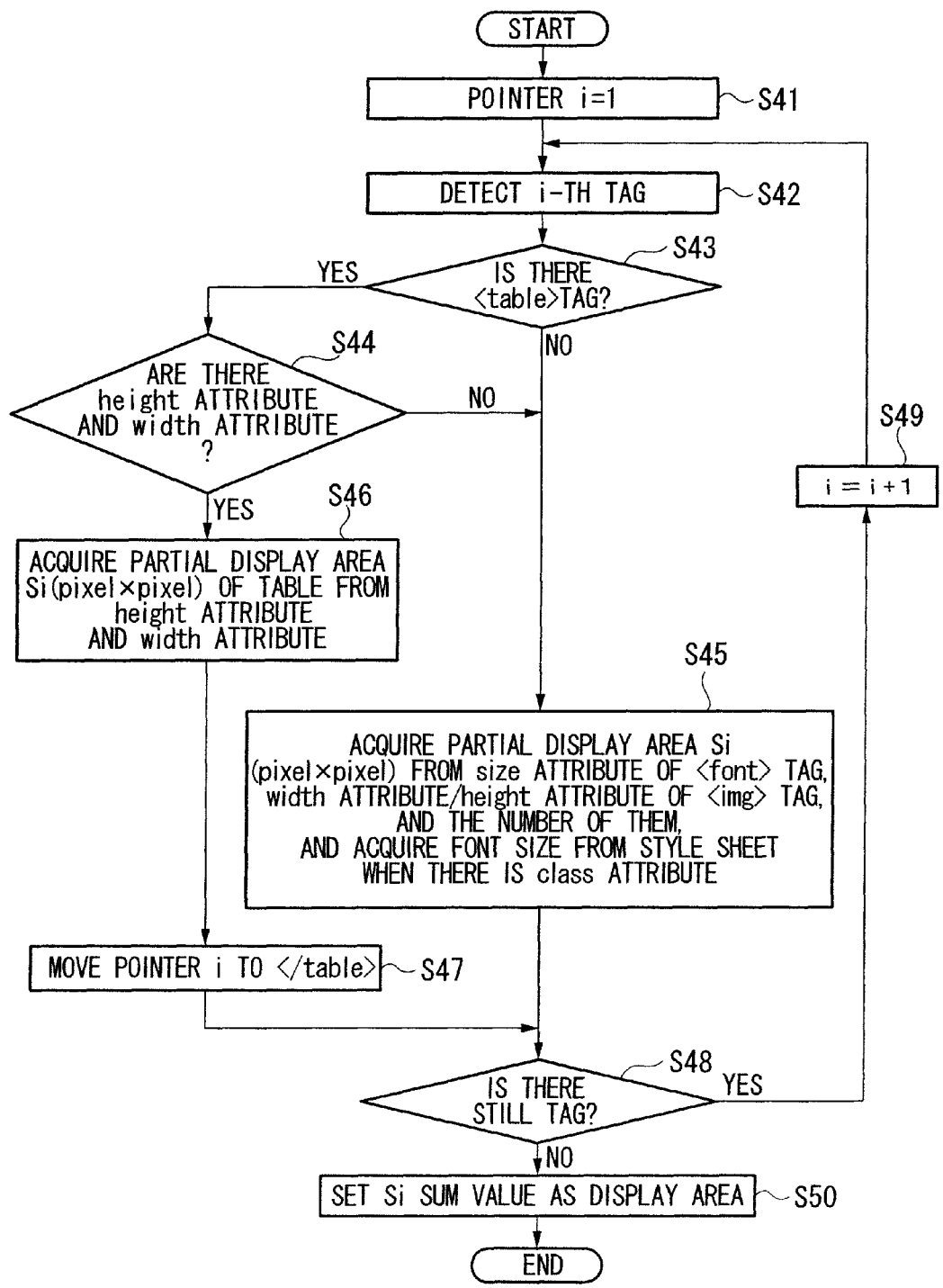
FIG. 6 is a flowchart illustrating a sequence of a calculation method of a display area according to an embodiment of the present invention.

FIG. 6 is a flowchart illustrating a sequence of the method of calculating the display area Sj according to the present embodiment. In FIG. 6, in Step S41, a pointer i is initialized to 1. The pointer i represents a number of the layout related tag of the primary divided HTML document that is the calculation target of the display area Sj. The initial value "1" of the pointer i represents the first layout related tag of the primary divided HTML document. When the pointer i is "2", the value represents the second layout related tag of the primary divided HTML document. That is, the pointer i represents the i-th layout related tag of the primary divided HTML document. The pointer i shown in FIG. 6 is different from the variable i shown in FIG. 4 and FIG. 5.

Subsequently, in Step S42, the primary divided HTML document that is the display area calculation target is searched, and the i-th layout related tag is detected. Then, in Step S43, when the detected i-th layout related tag is "<table>", the process proceeds to Step S44. Meanwhile, when the detected i-th layout related tag is not "<table>", the process proceeds to Step S45.

In Step S44, it is determined whether or not a "height attribute" and "width attribute" are added to the <table> tag. When there are both "height attribute" and "width attribute", the process proceeds to Step S46. Meanwhile, when there is no "height attribute" or "width attribute", the process proceeds to Step S45.

In Step S46, a partial display area Si concerning a table is calculated from the "height attribute" and "width attribute" added to the <table> tag. The "height attribute" is the number of pixels corresponding to the height of the table. The "width attribute" is the number of pixels corresponding to the width of the table. The partial display area Si concerning the table is calculated by the following equation.

Partial Display Area concerning Table Si="Number of Pixels of Height Attribute"×"Number of Pixels of Width Attribute"

Subsequently, in Step S47, the pointer i is moved to the </table> tag. Then, the process proceeds to Step S48.

On the other hand, as a result of Step S43, when the i-th layout related tag is not "<table>", the partial display area Si concerning texts and images corresponding to the i-th layout related tag is calculated in Step S45. Here, regarding a hyperlink described in a text type in the HTML document, its partial display area Si is also calculated as a text.

The partial display area Si concerning texts is calculated using a "size attribute" added to a <font> tag modifying texts (including hyperlinks). The "size attribute" is the number of pixels corresponding to the font size. The partial display area Si concerning text is calculated using the following equation.

Partial Display Area Si concerning Text="Number of Pixels of Size Attribute"×Number of Text Letters Here, when there is a "class attribute", the font size is acquired from a style sheet.

Regarding the calculation of the partial display area Si concerning images, an image file is acquired and the number of lengthwise and breadthwise pixels of the image is acquired. However, when a "width attribute" and a "height attribute" are added to an <img> tag for image display, calculation is performed using them. The "height attribute" is the number of pixels corresponding to the height of the image. The "width attribute" is the number of pixels corresponding to the width of the image. The partial display area Si concerning images is calculated by the following equation.

Partial Display Area Si concerning Image="Number of Pixels of Height Attribute"×"Number of Pixels of Width Attribute"

Subsequently, in Step S48, it is determined whether or not a layout related tag still exists. When a layout related tag exists, 1 is added to the pointer i in Step S49 and the process returns to Step S42. Meanwhile, when the process is completed for all the layout related tags of the primary divided HTML document, the process proceeds to Step S50.

In Step S50, the partial display areas Si concerning tables, texts, and images are summed, and the sum value is considered as the display area Sj concerning the primary divided HTML document.

According to the above-described embodiment, the primary division of the HTML document based on the density of the web page display area with using the layout related tag as a boundary is combined with the secondary division of the HTML document based on the distance between the content components in the data description. Further, the densities of the web page display areas corresponding to all the primary divided HTML documents are made lower than the predetermined value.

Figure 7:
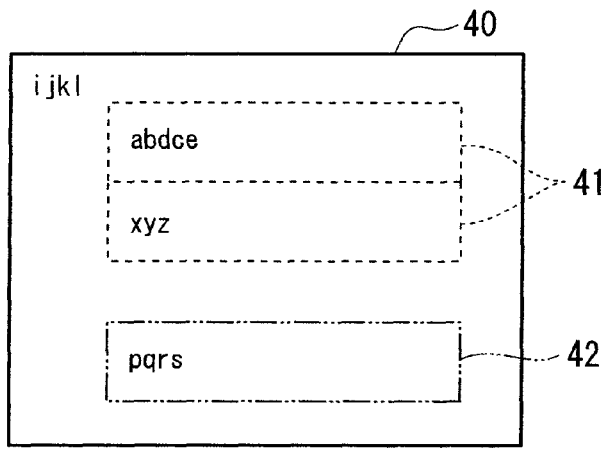
FIG. 7 is an example of a web page display screen.
Figure 8:
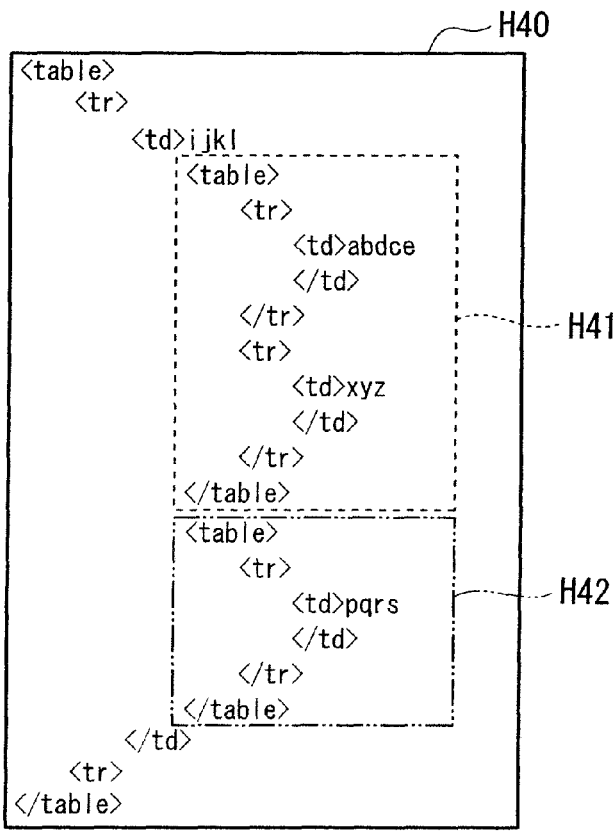
FIG. 8 is an example of a configuration of an HTML document corresponding to the web page in FIG. 7.

For example, in an original web page display screen 40 before division shown in FIG. 7, a content component (ijkl), content components (abcde) and (xyz), and a content component (pqrs) are laid out in a table format. FIG. 8 shows an HTML document H40 corresponding to the web page shown in FIG. 7. In the HTML document H40, the content component (ijkl) is laid out using a <tr> tag of the third hierarchy belonging to a <table> tag of the first hierarchy. The content components (abcde) and (xyz) are laid out using two <td> tags of the sixth hierarchy belonging to a <table> tag of the fourth hierarchy. The content component (pqrs) is laid out using a <td> tag of the sixth hierarchy belonging to the other <table> tag of the fourth hierarchy. In the case of this example, the HTML document H40 is primarily divided into two primary divided HTML documents using the <table> tag of the fourth hierarchy as a boundary. Each of the primary divided HTML documents is subject to a secondarily division on the basis of the distance between the content components in the data description, and the primary division is additionally performed on the primary divided HTML documents according to the densities of the primary divided HTML documents calculated using the number of divisions made by the secondary division.

According to the embodiment as described above, the densities of the web page display areas corresponding to all the primary divided HTML documents are limited to be lower than the predetermined value by the primary division and the secondary division. Furthermore, the division based on the distance between the content components in the data description is performed on the primary divided HTML documents. Accordingly, it is possible to appropriately adjust the display density of the content components per page in the web page after the division, and it is easy to view each of the web pages after the division when they are displayed on the terminal. The reason is because the division according to the display layout of the original web page before the division is realized.

Figure 9:
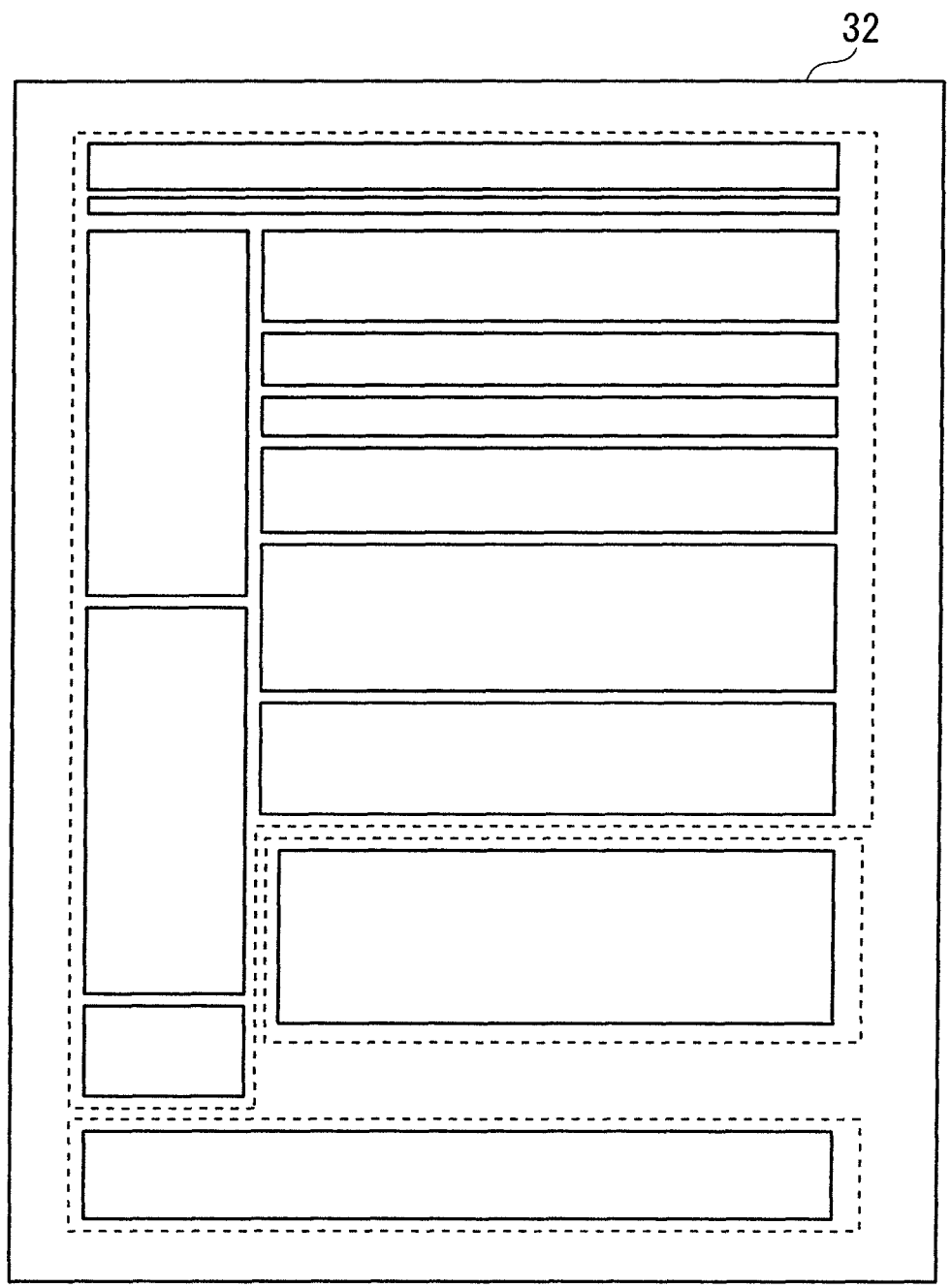
FIG. 9 is a schematic web page display screen for explaining effects according to the present invention.

For example, if the division of the HTML document based on the distance between the content components in the data description is only performed, a web page display screen 32 shown in FIG. 9 is divided into areas represented by broken lines shown in FIG. 9. For this reason, the display densities of the content components per page are different from one another in the divided web page, it is not easy to view the web page, and it does not correspond to the layout of the original web page before the division. Particularly, in a case where a screen is relatively small such as a mobile phone, there is a limit on the amount of data that can be suitably displayed, and it is important to divide the web page into data amounts for the optimal display area. According to the present embodiment, the web page is divided into areas represented by solid lines shown in FIG. 9 by the primary division and the secondary division. For this reason, the display densities of the content components per page in the divided web page are appropriately adjusted. Accordingly, it is easy to view each web page of the divided web pages when it is displayed on the terminal, and the web page corresponds to the display layout of the original web page before the division.

Next, an example of the secondary division unit 14 shown in FIG. 1 will be described.

The technologies described in Patent document 2 or Non-patent document 1 may be applied to the secondary division unit 14.

The secondary division unit 14 determines a division point of an HTML document on the basis of a distance between content components of the HTML document in the HTML description. The distance between the content components is obtained by integrating the nest depths of all tags described between two content components in the HTML document. The nest depth of the tags represents a division degree of the display layout in the web page.

Accordingly, the distance between the content components closely related to each other becomes short on the display layout of the web page. Meanwhile, the distance between the content components less related to each other becomes long. Particularly, in web pages realizing a complicated layout using such as table tags at multi-stages, such a tendency is high.

For this reason, the division point in the HTML document is determined considering that the longer the distance between the content components is, the lesser the content components are related to each other.

Figure 10:
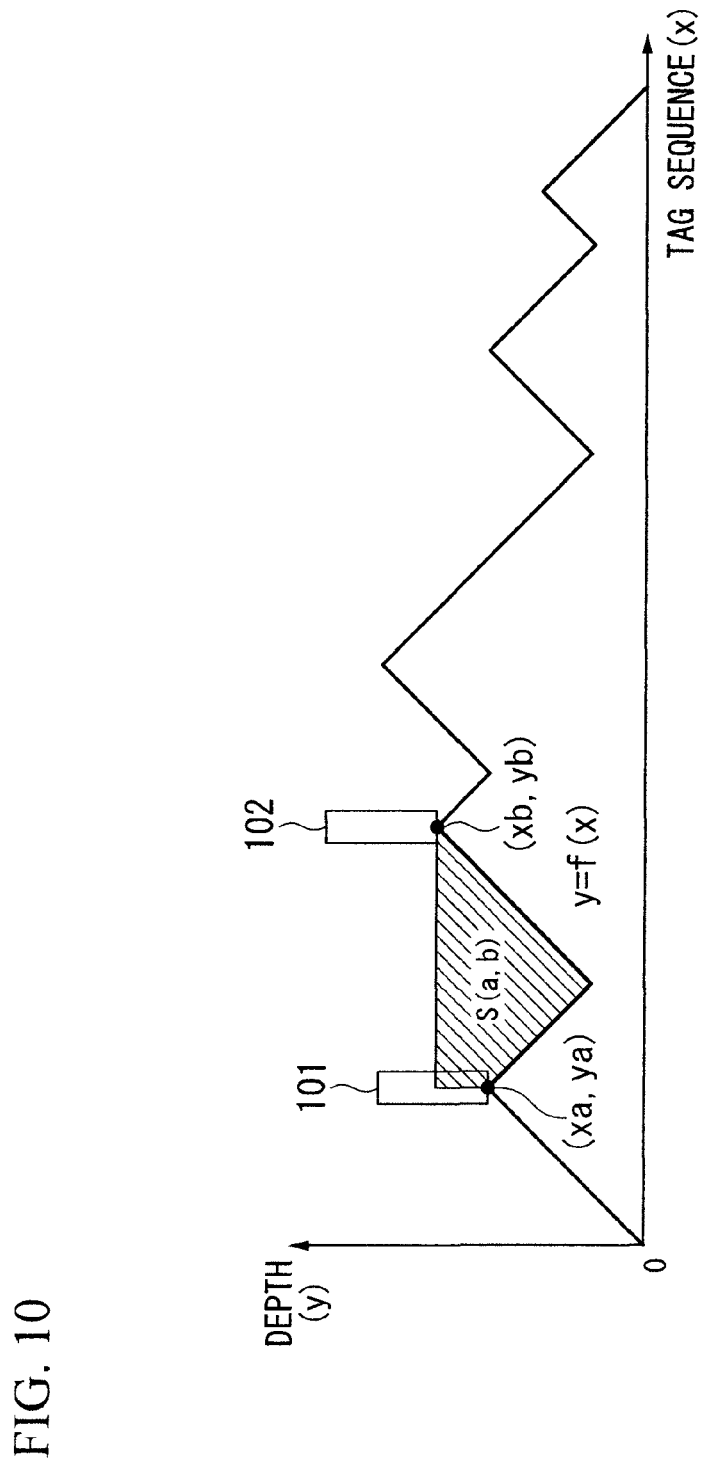
FIG. 10 is a graph diagram explaining a distance between contents according to the embodiment of the present invention.
Figure 11:
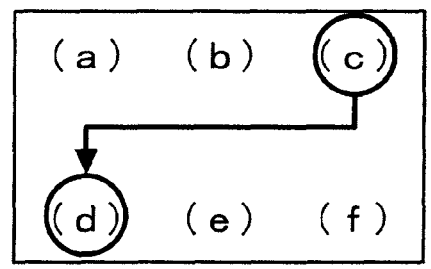
FIG. 11 is an example of a web page display screen.
Figure 12:
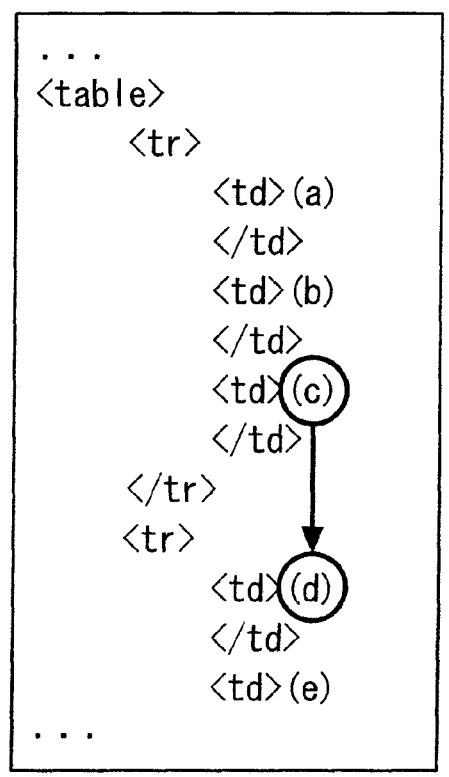
FIG. 12 is an example of a configuration of an HTML document corresponding to the web page in FIG. 12.

FIG. 10 is a graph diagram explaining the distance between the content components. In FIG. 10, the horizontal axis represents a tag sequence (x), and the vertical axis represents a nest depth (y) of tags. In the example shown in FIG. 10, the distance S (a, b) between the content components 101 and 102 is calculated. Specifically, the distance S (a, b) between the content components is calculated by the equation (1).

[Equation 1]

$$S_{(a,b)} = \max\left\{\sum_{i=x_a}^{x_b} |\max\{y_b, y_a\} - f(i)|, \sum_{i=x_a}^{x_b} |\min\{y_b, y_a\} - f(i)|\right\} \quad (1)$$

Here, $x_a$ is the tag sequence of the content component 101, $y_a$ is the nest depth of the content component 101, $x_b$ is the tag sequence of the content component 102, $y_b$ is the nest depth of the content component 102, and f(x) is a function of providing the nest depth (y) of a tag corresponding to the tag sequence (x).

The secondary division unit 14 calculates the distances between all the content components in the HTML document. The secondary division unit 14 determines the division point of the HTML document by comparing the largeness and smallness of the calculated distances between the content components. At this time, the secondary division unit 14 uses division parameters (threshold values N1 and N2, N1>N2) for the determination standard of the distance between the content components. The division parameters (threshold values N1 and N2) are the determination standard of the distance between the content components to determine the division point of the HTML document. The sequence (Steps S111 to S115) of determining the division point of the HTML document is described below.

Step S111: the whole HTML document that is the division target is set to one content object (ObjectID=root).

Step S112: when the maximum value (Smax) of the distance between the content components in the content object is equal to or more than N1 times the average value (Saverage) of the distance between the content components in the content object, the location between the content components corresponding to the maximum value (Smax) is determined as the division point.

Step S113: in the case where the determination by the threshold value N1 in Step S112 is not YES, when the maximum value (Smax) is equal to or more then N2 times the average value (Saverage) and the number of the content components in one content object after the division is equal to or more than the threshold value M, the location between the content components corresponding to the maximum value (Smax) is determined as the division point.

Step S114: when a division point of the content object (ObjectID=root) is newly found in Step S112 or Step S113, the content object of the division result is set to an target (ObjectID=root) and the above processes of Steps S112 and S113 are performed.

Step S115: when a new division point of the content object is not newly found in Step S112 or Step S113, the process is ended.

The secondary division unit 14 performs the above division point determining processes (Steps S111 to S115) on the primary divided HTML document received from the primary division unit 13 as a target, and determines the division point of the primary divided HTML document. The secondary division unit 14 divides the primary divided HTML document according to the division point. In addition, the secondary division unit 14 transmits the number of divisions Nk concerning the primary divided HTML document to the primary division unit 13.

The division parameters (threshold values N1 and N2) may be predetermined fixed values, and the appropriate threshold values N1 and N2 may be actively calculated for each web page. A method of actively calculating the division parameters (threshold values N1 and N2) is described in Non-patent document 1.

In the above-mentioned embodiment, the content conversion server 1 may be realized as an individual device as shown in FIG. 1, or may be provided in the web server 2 or the terminal 3.

The content conversion server 1 may be realized by dedicated hardware, or may be configured by a general-purpose computer system such as a personal computer to realize the functions by executing a program for realizing the functions of the content conversion server 1 shown in FIG. 1.

The content conversion process may be performed by recording the program for realizing the functions of the content conversion server 1 shown in FIG. 1 in a computer-readable recording medium, and causing the computer system to read and execute the program recorded in the recording medium. Here, the "computer system" may include an OS or hardware such as peripheral devices.

The "computer system" also includes a home page providing environment (or a display environment) when using a WWW system.

The "computer-readable recording medium" includes writable non-volatile memories such as a flexible disk, a magneto-optical disk, a ROM, a flash memory, portable media such as a CD-ROM, and storage devices such as hardware in a computer system.

The "computer-readable recording medium" includes those that hold a program for a fixed time, such as a volatile memory (e.g. a dynamic random access memory {DRAM} etc.) in computer systems that become servers and clients when a program is transmitted via a communication line such as a telephone line or a network such as the Internet.

The program may be transmitted from a computer system where it was stored in a storage device to another computer system via a transmission medium, or by transmission waves in a transmission medium. Here, a 'transmission medium' for transmitting the program denotes a medium having a function of transmitting information such as a network (communication network) such as the Internet and a communication wire (communication line) such as a telephone line.

Further, it is acceptable for the program to realize some of the functions described above. The functions can also be realized in combination with a program already stored in the computer system, in what is known as a differential file (differential program).

As described above, the embodiment according to the present invention has been described with reference to the drawings, but the detailed configuration is not limited to the embodiment and may be modified within the scope of the present invention.

INDUSTRIAL APPLICABILITY

The present invention can be applied to the content conversion system. According to the content conversion system, when the contents such as web pages are formed of the content components such as images, texts, and hyperlinks, and the display layout of the content components is designated using the tag description such as HTML, it is possible to contribute to the appropriate division according to the display layout of the original contents before the division at the time of providing the divided contents to the mobile terminal or the like.

The invention claimed is:

1. A content conversion system that comprises a CPU to divide content data in which a display layout of content components is described using tags, so as to display, on a terminal, contents formed of the content components displayed on a screen, the content conversion system comprising:
   a primary division unit that obtains primary divided content data by dividing the content data on a basis of the display layout of the content components;
   a secondary division unit that determines the number of divisions on a basis of a distance between the content components in a data description included in the primary divided content data, the secondary division unit dividing the primary divided content data by the number of divisions; and
   a layout related tag determining unit that determines whether or not the content data includes a layout related tag, wherein only dividing by the secondary division unit is performed when the content data includes no layout related tag, wherein
   the primary division unit calculates a density by dividing a display area related to the primary divided content data by the number of divisions, and repeats a calculation of the density until the primary division unit determines that the density satisfies a predetermined condition, and
   wherein the layout related tag determining unit determines whether or not a description of the layout related tag in the content data is grammatically correct, and wherein only dividing by the secondary division unit is performed when the description of the layout related tag is grammatically incorrect.

2. The content conversion system according to claim 1, wherein the primary division unit calculates the display area related to the primary divided content data using a tag attribute value representing size of the content components.

3. A non-transitory recording medium storing a computer program for performing content conversion of dividing content data in which a display layout of content components is described using tags, so as to display, on a terminal, contents formed of the content components displayed on a screen, the computer program comprising:
   a primary division function that obtains primary divided content data by dividing the content data on a basis of the display layout of the content components;
   a secondary division function that determines the number of divisions on a basis of a distance between the content components in a data description included in the primary divided content data, the secondary division function dividing the primary divided content data by the number of divisions; and
   a layout related tag determining unit that determines whether or not the content data includes a layout related tag, wherein only dividing by the secondary division unit is performed when the content data includes no layout related tag, wherein
   the primary division function calculates a density by dividing a display area related to the primary divided content data by the number of divisions, and repeats a calculation of the density until the primary division unit determines that the density satisfies a predetermined condition, and
   wherein the layout related tag determining unit determines whether or not a description of the layout related tag in the content data is grammatically correct, and wherein only dividing by the secondary division unit is performed when the description of the layout related tag is grammatically incorrect.

* * * * *